United States Patent Office 3,661,901
Patented May 9, 1972

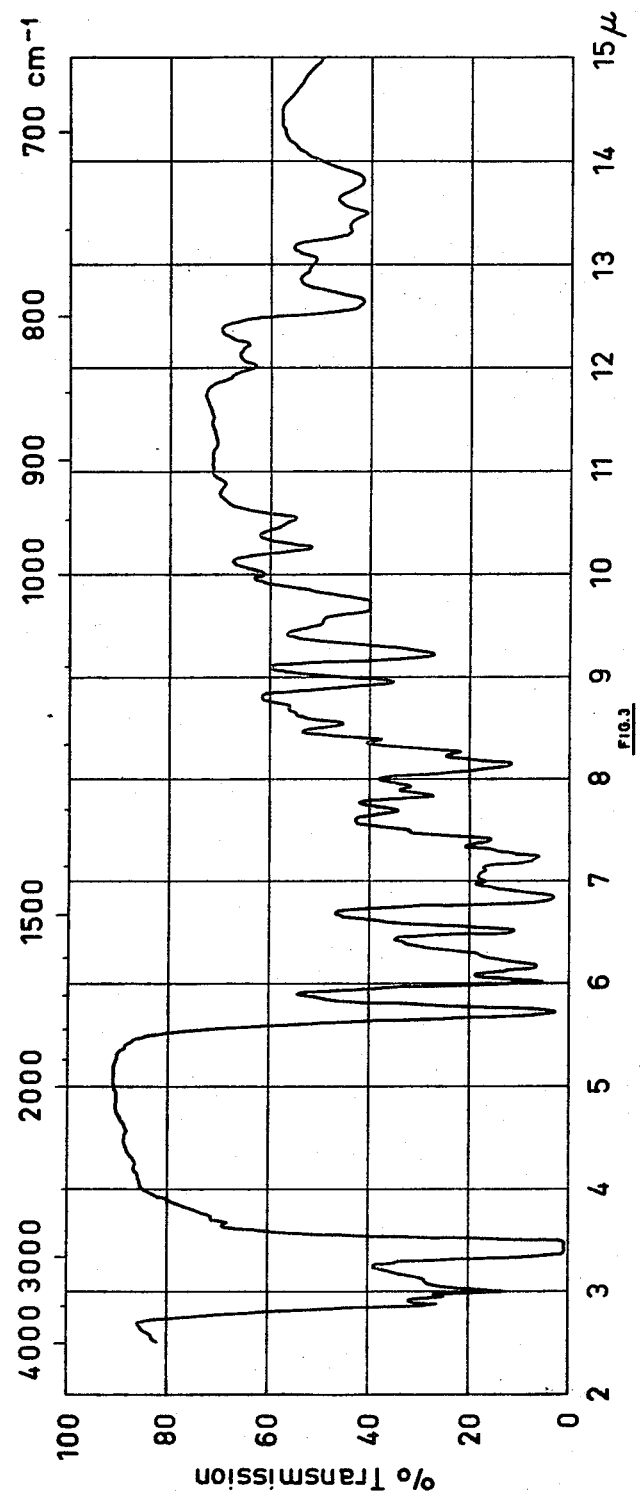

3,661,901
HEAVY METAL COMPLEXES OF CEPHALOSPORIN C AND PROCESS FOR THE ISOLATION OF CEPHALOSPORIN C IN THE FORM OF SUCH COMPLEXES
Hans Bickel, Binningen, Rolf Bosshardt, Arlesheim, Bruno Fechtig, Reinach, Walter Voser, Allschwil, Johannes Mueller, Arlesheim, and Heinrich Peter, Riehen, Switzerland, assignors to Ciba Corporation, Summit, N.J.
Filed June 4, 1969, Ser. No. 830,334
Claims priority, application Switzerland, June 14, 1968, 8,835/68
Int. Cl. C07d 99/24
U.S. Cl. 260—243 C
12 Claims

ABSTRACT OF THE DISCLOSURE

Sparingly soluble microcrystalline heavy metal complexes of cephalosporin C and a process for isolating cephalosporin C in the form of such complexes from solutions obtainable in the fermentation of cephalosporin C.

---

Figure 1:
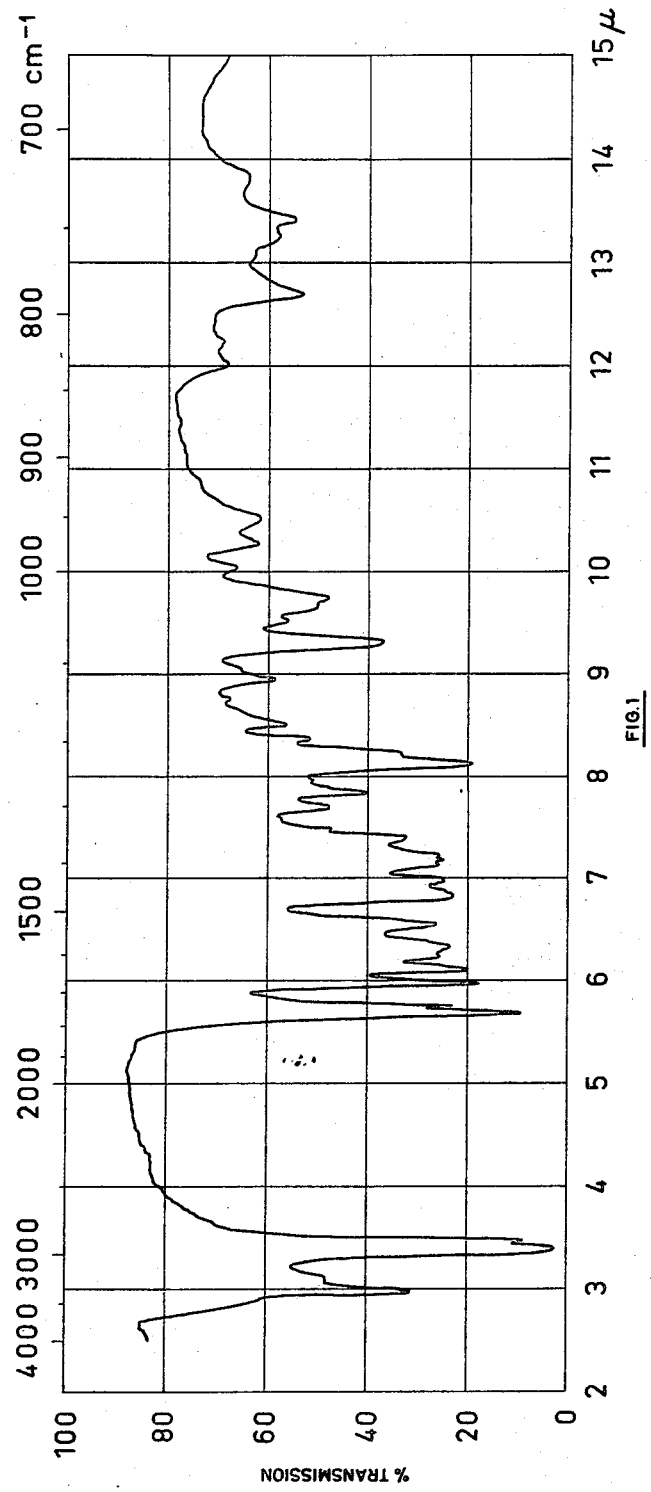

The present invention provides sparingly soluble heavy metal complexes of cephalosporin C and a process for the isolation of cephalosporin C in the form of such complexes from solutions obtainable in the fermentation of cephalosporin C, these complexes being suitable for further transformation into cephalosporin C or 7-aminocephalosporin acid.

It is known that in the preparation of cephalosporin C by fermentation an aqueous solution is obtained in which the cephalosporin C is contained in a small quantity in addition to numerous other dissolved substances some of which have similar physical and chemical properties, for example in addition to varying quantities of cephalosporin N, which is likewise a hydrophilic antibiotic.

The manufacture of pure cephalosporin C from such culture solutions, or from the crude product accessible therefrom or from very dilute, for example 2% to 3% aqueous solutions, is very intricate and difficult. The crude product obtained is in most cases a smeary, inhomogeneous mixture of varying composition and varying physical and chemical properties so that it is often necessary to vary the processing from batch to batch.

One process proposed for isolating cephalosporin C from fermentation solutions consisted, for example, in adsorbing cephalosporin C on active carbon, then eluting and adsorbing the eluted material on alumina, eluting and adsorbing it on an anion exchange resin, eluting the crude cephalosporin C with an aqueous buffer solution of pH 2.5 to 8.0, for example pyridine acetate, and extracting it with solvents; cf. German specification 1,014,-711.

According to another process cephalosporin C is manufactured by solvent fractionation, especially between water and phenol or alkyl-substituted phenols. As a further alternative it was proposed to treat eluates from the active carbon column or alumina column or from the column of ion exchange resins under such conditions of temperature and acidity that the cephalosporin N present in the culture filtrate is converted into penicillic acid but cephalosporin C remains practically intact, or decomposing cephalosporin N with penicillinase and then isolating cephalosporin C by fractional extraction with solvents or by chromatography with an ion exchange resin. It has also been tried to adsorb cephalosporin C from the acid-treated medium directly by means of an ion exchange resin, but this direct adsorption has disadvantages since, owing to the presence of anions other than cephalosporin C, a very large quantity of anion exchange resin was required, and moreover the chloride ions were eluted at the same time and caused difficulties in the subsequent stages of the process.

Finally, a process was described in which the clarified fermentation medium was adjusted to a pH value from 2.8 to 4.0 by means of a cation exchange resin in the $H^+$-form containing strongly acidic groups, then the cation exchange resin was isolated from the acidified medium and the latter was then freed from practically all chloride ions and other inorganic anions with a strong anion exchange resin in the form of a salt with a weak, volatile monobasic organic acid, and finally cephalosporin C was obtained from the percolate, for example by adsorption on an anion exchange resin in the acetate form and elution with pyridine acetate buffer (see German Patent 1,126,564). It is also known to purify crude cephalosporin C by conversion into crystalline salts such as the sodium or barium salt, but these salts can be crystallized only from a relatively concentrated and previously purified solution and owing to the good solubility of these salts in water large losses during crystallization must be accepted.

The present invention provides an advantageous process for isolating a microcrystalline metal complex of cephalosporin C with a heavy metal from a solution, particularly from a dilute and/or contaminated solution, for example a fermentation liquid or eluate. This metal complex can be isolated in a homogeneous, readily filterable and stable form from the solution contaminated with the further water-soluble substances. The complex is easy to convert into cephalosporin or a water-soluble salt thereof or it may be used as it is for further processing leading to 7-aminocephalosporanic acid.

The process of the present invention is characterized in that a metal complex of cephalosporin C with a heavy metal is precipitated from a dilute aqueous solution containing cephalosporin C. Particularly suitable metals are bivalent heavy metals such as copper, nickel, lead, cobalt, iron, manganese, mercury, cadmium or in the first place zinc. The precipitation is performed in an aqueous solution by means of a water-soluble salt of the heavy metal chosen, for example with a sulphate, halide, especially chloride, and primarily with the acetate.

The metal complex is precipitated at a pH value from about 3 to 7, preferably 5 to 6. Cephalosporin C may be present in the aqueous solution in the form of the free acid or of a salt, for example an alkali or alkaline earth metal or ammonium salt, such as the sodium or calcium salt or a salt with an organic base such as triethylamine. The aqueous solution may also contain water-miscible organic solvents, for example alcohols such as ethanol or isopropanol.

The microcrystalline metal complex is easy to isolate from the solution, for example by filtering, suctioning or centrifuging. It is then advantageously washed with water and/or organic solvents.

For converting the complex into cephalosporin C or its water-soluble salts such as alkali metal or ammonium salts, the complex is treated, for example, with bicarbonate solution or dilute sodium hydroxide solution or a suitable cation exchange resin (for example "Amberlite" IRC–50 or IR–120 or "Dowex" chelating resin A–1 in the Na-form), or the heavy metal is precipitated as its sulphide, or it may be converted into a sparingly soluble complex with an organic complex-former such as 8-hydroxyquinoline or 8-hydroxyquinaldine.

It is also possible to use the complex as it is for the manufacture of 7-aminocephalosporanic acid, for example by manucfacturing from it 7-aminocephalosporanic acid by the processes described in Belgian Pats. 643,899 and No. 720,185.

Furthermore, it is advantageous to purify the complex further by recrystallization, for example by dissolving the complex in an acid, for example acetic acid, and reprecipitating it from the acid solution by addition of a base, such as dilute sodium hydroxide solution or triethylamine.

The heavy-metal complexes of cephalosporin C are new and are likewise included in the present invention. They are 1:1-complexes, that is to say the complex contains for every mol of cephalosporin C one atom of the metal. In paper-electrophoresis the complex travels as a unitary substance spot. It is very sparingly soluble in water and organic solvents. The following table shows its solubility in gram per 100 ml. of the complex in water, lower alkanols and/or acetone:

TABLE

| Solvent | Cu-complex at— | | Zn-complex at— | | Hg-complex at— | |
| --- | --- | --- | --- | --- | --- | --- |
| | 0° C. | 23° C. | 0° C. | 23° C. | 0° C. | 23° C. |
| Distilled water | 0.058 | 0.066 | 0.166 | 0.095 | | 0.059 |
| Methanol | 0.019 | 0.052 | 0.037 | 0.035 | | 0.015 |
| Ethanol | 0.027 | 0.019 | 0.034 | 0.027 | | 0.006 |
| Isopronaol | 0.022 | 0.015 | 0.010 00 | 0.001 | | 0.006 |
| Acetone | 0.016 | 0.029 | 0.005 | 0.014 | | |

NOTE:
| Distilled water at 23° C: | Parts |
| --- | --- |
| Fe-complex | 0.? |
| Co-complex | 0.03 |
| Ni-complex | 0.14 |
| Cd-complex | 0.04 |

For the preparation of the solutions containing cephalosporin C, used as starting material, the ordinary methods for the isolation of acidic hydrophilic natural products from fermentation liquids, for example antibiotics, growth promoting substances or vitamins, are used. Examples of such methods are more especially:

(1) Adsorption or absorption, for example on active carbon such as "Norit"; on basic adsorption agents such as alumina; on non-ionic decolouration and/or adsorption resins, such as "Asmit" (phenylenediamine-formaldehyde-condensation product of Imacti-Maatsch.), "Amberlite" XAD–1, XAD–2, XAD–4 or XAD–5 (polystyrene polymers of Roehm & Haas), "Amberlite" XAD–7 or XAD–8 (acrylic acid polymers); on basic ion exchange resins such as "Amberlite" IR–48 (phenol polyamine with primary and secondary amino groups, weakly alkaline), "Amberlite" IR–45, IRA–93 (styrene-divinylbenzene polymers with primary, secondary or tertiary amino groups, weakly alkaline) "Amberlite" XE–265 (polyamine, weakly alkaline), "Amberlite" 68 (methacrylic acid polymer, weakly alkaline), "Amberlite" IRA–400, IRA–401, IRA–402, IRA–410 (styrene-divinylbenzene polymers with quaternary amino groups, strongly alkaline), "Amberlite" LA–1, LA–2 or LA–3 (liquid secondary or primary amines with high molecular weight) or on corresponding ion exchange resins of other firms such as "Dowex 1 to 4" (Dow Chemical Co.), "De-Acidit" FF (The Permutit Co.) "Imac A 13, A 17, A 20, S. 5–40 (Imacti-Maatsch.);

(2) Distribution between solvents, for example between water and phenol or alkyl-substituted phenols, the pH being acidic or weakly alkaline;

(3) Chemical or biological destruction of by-products, for example by means of acids such as sulphuric acid or oxalic acid or acidic ion exchangers, for example "Amberlite" IR–120 (styrene-divinylbenzene polymer with sulphonic acid groups) or by means of enzymes, for example penicillinase.

The following examples illustrate the invention.

EXAMPLE 1

A solution of 44 g. of crystalline zinc acetate [Zn(OOCCH$_3$)$_2$.2H$_2$O] in 88 ml. of water is added to 156 ml. of a solution, containing about 7.7% of cephalosporin and 3 times to 4 times the quantity of impurities stemming from the culture filtrate, with stirring and cooling in an ice-bath, the mixture remaining clear.

While stirring vigorously and continuing the cooling with ice 260 ml. of dry ethanol is run in (within 10–15 minutes) in a fine jet from a dropping funnel, and the mixture is seeded with a trace of cephalosporin C-zinc complex and stirred on for 1¼ hours. During this the clouding formed becomes very strong after about 15 minutes and a fine crystalline precipitate begins to settle out which is suctioned off, washed with a small quantity of a 6:4-mixture of ethanol and water and then rinsed with 95% ethanol and the residue is dried under a high vacuum, to yield 6.2 g. of substantially pure cephalosporin C-zinc complex.

Ultraviolet spectrum: $\lambda_{max}$ 262 m$\mu$ ($\epsilon$=7300). Infrared spectrum in Nujol: see FIG. 1. In paper-electrophoresis in a potassium-sodium phosphate buffer (1/15-molar; pH 5.5; 1½ hours; 2000 volts) the complex travels as a unitary substance spot, which can be identified with UV- or ninhydrincollidine, by 10 cm. towards the anode.

The starting solution may be prepared as follows:

According to the method described in British specification 968,324 the culture solution containing cephalosporin C is filtered with the addition of a filter-assistant, the filtrate is adjusted to pH 3 with a strongly acidic ion exchange resin in the acid form and allowed to run through an alkaline exchange resin in the acetate form in order to exchange the inorganic anions for acetate, the cephalosporin C is absorbed on Amberlite IR–4B and eluted with a pyridine acetate buffer; from the concentrated eluate the crude cephalosporin C is precipitated with acetone, filtered and dried. 43.5 g. of the resulting precipitate (content of cephalosporin C, 27.5%) are dissolved in 156 ml. of water.

EXAMPLE 2

1.3 g. of a precipitate of crude cephalosporin C (purity 23%) which has been obtained by the method described in Example 1, are dissolved in 3.8 ml. of water. A solution of 1.1 g. of zinc acetate in 2.4 ml. of water is added. 8.2 ml. of isopropyl alcohol are added dropwise and the whole is stirred for 5 hours at 0° C. After filtering with suction and drying, 208.5 mg. of an almost colourless crystallisate are obtained.

EXAMPLE 3

4 g. of a precipitate of crude cephalosporin C (purity 40%), obtained by the method described in Example 1, are dissolved in 14.5 ml. of water. 0.6 ml. of triethylamine and 1.8 g. of copper acetate hydrate in 40 ml. are added to the solution. The clear, deep dark-green solution is seeded with crystalline copper complex of cephalosporin C and left overnight in a refrigerator. The microcrystalline precipitate is suctioned off and washed with 100 ml. of ice water, 95% alcohol and with ether and dried under vacuum, to yield 1.298 g. of 88% cephalosporin C-copper complex. The ultraviolet absorption specrum contains a maximum at 2666–267 m$\mu$ ($\epsilon$=10,000) and at 232 m$\mu$ a minimum.

When 2 parts by volume of alcohol are added to the filtrate, a precipitate of 0.690 g. of material of about 60% strength is obtained.

The cephalosporin C-copper complex used for seeding may be manufactured thus:

3.184 grams of 89:5% cephalosporin C in the form of the free acid are dissolved with stirring in 31.8 ml. of distilled water and 1.5 ml. of triethylamine are added. This solution (pH about 7.5) is immediately mixed with a solution of 1.685 g. of copper acetate hydrate in 73.8 ml. of water (pH 4.8), whereupon a bright blue-green precipitate begins to settle out of the clear dark-green solution. The whole is kept overnight at 0° C. and the microcrystalline product is filtered off, washed with 25 ml. of cold water, with 2×25 ml. of 95% ethanol and 4 times with ether and dried under vacuum. Yield 3.227 g. (about 94% of theory) of the pure cephalosporin C-copper complex, which reveals in the ultraviolet spectrum in 0.1

Figure 2:
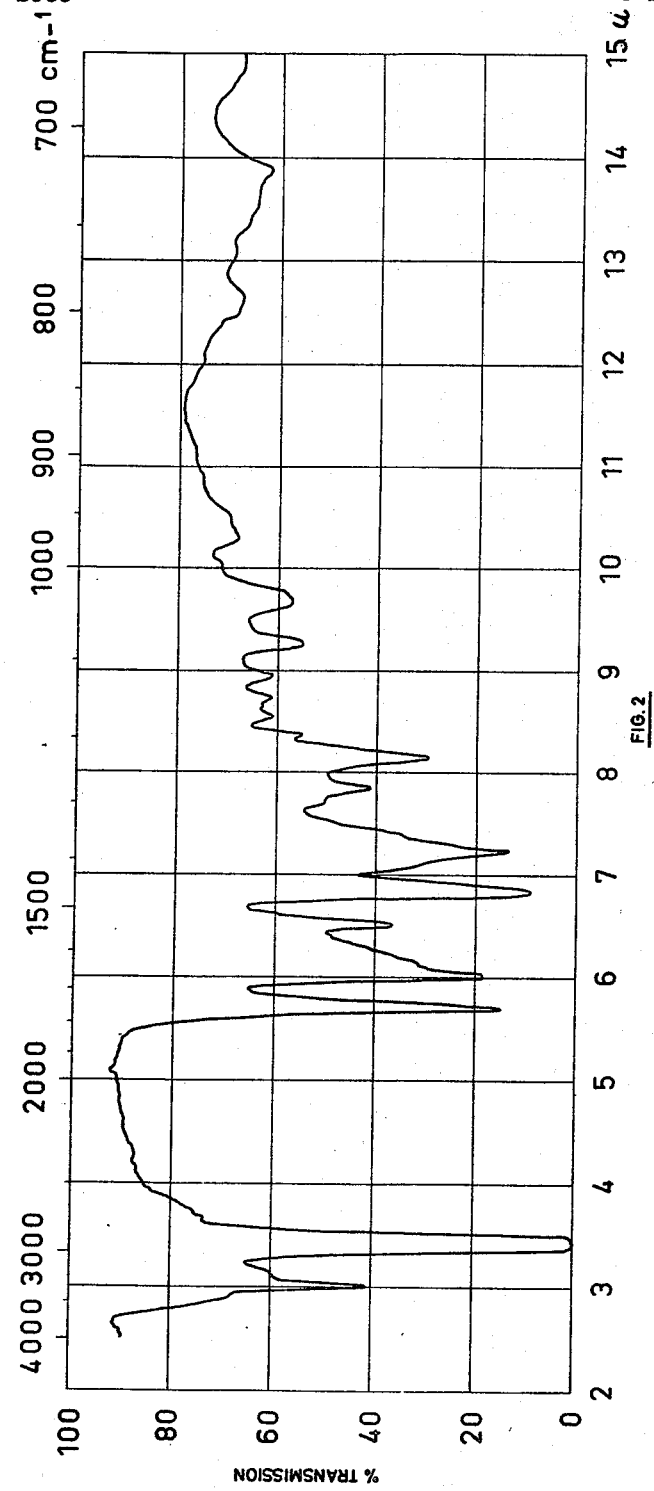

N-sodium bicarbonate solution $\lambda_{max}$=266–267 m$\mu$ ($\epsilon$=11,300). The infrared spectrum in Nujol contains inter alia bands at 291 (shoulder, w.), 3.01 (m.), 5.71 (s.), 6.01 (s.), 6.03 (s.), 6.13 (shoulder, m.), 6.51 (m.), 7.85 (wm.), 8.15 (m.), 8.38 (w.), 8.55 (w.), 8.75 (w.), 8.96 (w.), 9.28 (wm.), and 9.68 (wm.)$\mu$; see FIG. 2.

Elementary analysis reveals: N=8.5% (calculated 8.8%); S=6.7% (calculated 6.7%); Cu (determined by oscillography)=14.1% (calculated 13.7%).

EXAMPLE 4

0.50 g. of about 85% cephalosporin C sodium salt dihydrate ($\lambda_{max}$=260 nm., $\epsilon$=7,350 in H$_2$O) is dissolved in 8 ml. of distilled water. 0.27 g. of nickel chloride (anhydrous) in 2 ml. of water is added to the yellow solution, its pH value being reduced from 5.5 to 4.0. Ethanol is added to the clear green solution until turbidity sets in and the whole is kept overnight in a refrigerator. The fine crystals are filtered with suction, washed with water, a mixture of alcohol and water, and alcohol, and dried. The pale green product shows in 0.01 N acetic acid in extinction coefficient of 8.650 at 260 nm. $[\alpha]_D^{20}$=+82° ±1° (c.=0.996% in 0.5 N NaHCO$_3$ solution). The quantitative hydroxylamine test yields a content of 100%. IR spectrum in Nujol: see FIG. 3.

EXAMPLE 5

The cobalt-(II)-complex of cephalosporin C is prepared from 0.50 g. of cephalosporin C sodium salt dihydrate and 0.525 g. of cobalt-(II)-acetate (tetrahydrate) with the addition of 0.1 ml. of glacial acetic acid, in a manner analogous to that described in Example 4. The microcrystalline pink precipitate becomes blue-violet on being dried over phosphorus pentoxide.

EXAMPLE 6

The faintly beige-coloured cadmium complex of cephalosporin C is prepared in a manner analogous to that described in Example 4 from 0.50 g. of cephalosporin C sodium salt dihydrate and 0.560 g. of cadmium acetate (dihydrate) with the addition of 0.1 ml. of glacial acetic acid. Its optical rotation in 0.1 ml. of complexone solution (EDTA.Na$_2$) is +79° ±1° (c.=0.958%).

EXAMPLE 7

The ferric-(II)-complex of cephalosporin C is prepared in an analogous manner to that described in Example 4 from 0.50 g. of cephalosporin C sodium salt dihydrate and 0.342 g. of ferric-(II)-chloride (dihydrate). It is obtained in the form of grey-brown microcrystals.

We claim:
1. A process for the isolation of sparingly soluble 1:1 complexes of cephalosporin C from fermentation solution containing cephalosporin C wherein a water-soluble divalent heavy metal salt is added to the fermentation solution whereby a sparingly soluble complex of the divalent metal with cephalosporin C is precipitated.
2. A process as claimed in claim 1, wherein zinc is used as complex-forming metal.
3. A process as claimed in claim 1, wherein the complex is precipitated in the presence of a water-miscible organic solvent.
4. A process as claimed in claim 1, wherein the complex is precipitated in the presence of a water-miscible lower alkanol.
5. A 1:1 complex of cephalosporin C with a divalent heavy metal.
6. A 1:1 complex of cephalosporin C as claimed in claim 5, the heavy metal being mercury.
7. A 1:1 complex of cephalosporin C as claimed in claim 5, the heavy metal being copper.
8. A 1:1 complex of cephalosporin C as claimed in claim 5, the heavy metal being zinc.
9. A 1:1 complex of cephalosporin C as claimed in claim 5, the heavy metal being cadmium.
10. A 1:1 complex of cephalosporin C as claimed in claim 5, the heavy metal being cobalt.
11. A 1:1 complex of cephalosporin C as claimed in claim 5 the heavy metal being nickel.
12. A 1:1 complex of cephalosporin C as claimed in claim 5, the heavy metal being iron.

References Cited
UNITED STATES PATENTS

| | | | |
|---|---|---|---|
| 3,520,884 | 7/1970 | Sharp et al. | 260—243 C |
| 3,522,248 | 7/1970 | Voser | 260—243 C |

NICHOLAS S. RIZZO, Primary Examiner

U.S. Cl. X.R.

260—242